(12) United States Patent
Sone et al.

(10) Patent No.: US 9,847,837 B2
(45) Date of Patent: Dec. 19, 2017

(54) OPTICAL LINE TERMINATION, COMMUNICATION SYSTEM, AND COMMUNICATION CONTROL METHOD

(71) Applicant: FUJITSU LIMITED, Kawasaki-shi, Kanagawa (JP)

(72) Inventors: Kyosuke Sone, Kawasaki (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/368,004

(22) Filed: Dec. 2, 2016

(65) Prior Publication Data

US 2017/0187459 A1 Jun. 29, 2017

(30) Foreign Application Priority Data

Dec. 25, 2015 (JP) ................................. 2015-255202

(51) Int. Cl.
| | | |
|---|---|---|
| H04B 10/00 | (2013.01) | |
| H04B 10/27 | (2013.01) | |
| H04B 10/80 | (2013.01) | |
| H04W 52/02 | (2009.01) | |
| H04W 88/08 | (2009.01) | |

(52) U.S. Cl.
CPC ............. *H04B 10/27* (2013.01); *H04B 10/80* (2013.01); *H04W 52/0235* (2013.01); *H04W 88/08* (2013.01)

(58) Field of Classification Search
CPC ....... H04Q 11/0067; H04Q 2011/0079; H04Q 2011/0064; H04L 12/12; H04B 10/272
USPC .......................................................... 398/58
See application file for complete search history.

(56) References Cited

U.S. PATENT DOCUMENTS

| | | | | |
|---|---|---|---|---|
| 2009/0263127 | A1* | 10/2009 | Haran ................ | H04Q 11/0067 398/38 |
| 2012/0128357 | A1* | 5/2012 | Mukai .................. | H04B 10/272 398/58 |
| 2015/0208347 | A1* | 7/2015 | Iiyama ..................... | H04L 12/12 370/311 |
| 2015/0280851 | A1* | 10/2015 | Sarashina ............ | H04J 14/0256 398/72 |
| 2015/0373640 | A1 | 12/2015 | Iiyama et al. | |

FOREIGN PATENT DOCUMENTS

| | | |
|---|---|---|
| JP | 2011-103570 | 5/2011 |
| WO | WO 2014/103804 A1 | 7/2014 |

* cited by examiner

*Primary Examiner* — Don N Vo
(74) *Attorney, Agent, or Firm* — Staas & Halsey LLP

(57) ABSTRACT

An optical line termination includes a detection circuit configured to detect a sleep request from a control apparatus to base stations; a determination circuit configured to determine, when the detection circuit detects the sleep request, whether processing of turning the base stations of requestees by the sleep request into a sleep state in accordance with the sleep request is approvable or not, based on a shortage bandwidth within a passive optical network in a different one of the base stations having a predetermined relationship with the requested base station; and a control circuit configured to discard the sleep request when the determination circuit determines that the processing is not approvable, or transfer the sleep request to the base station of the different requestee when the determination circuit determines that the processing is approval.

18 Claims, 11 Drawing Sheets

FIG. 4

| ONU-ID | #1 | #2 | #3 | #4 | #5 |
|---|---|---|---|---|---|
| ALLOCATED BAND (Mbps) | 100 | 200 | 200 | 300 | 200 |
| REQUESTED BAND (Mbps) | 0 | 300 | 200 | 300 | 300 |
| POSITION INFORMATION | P1 | P2 | P3 | - | - |

FIG. 9

WORKING HOURS

| ONU-ID | #1 | #2 | #3 | #4 | #5 |
|---|---|---|---|---|---|
| ALLOCATED BAND (Mbps) | 50 | 100 | 100 | 400 | 400 |
| REQUESTED BAND (Mbps) | 40 | 90 | 90 | 500 | 500 |
| POSITION INFORMATION | P1 | P2 | P3 | - | - |

OFF-DUTY HOURS

| ONU-ID | #1 | #2 | #3 | #4 | #5 |
|---|---|---|---|---|---|
| ALLOCATED BAND (Mbps) | 300 | 300 | 300 | 50 | 50 |
| REQUESTED BAND (Mbps) | 290 | 300 | 200 | 10 | 10 |
| POSITION INFORMATION | P1 | P2 | P3 | - | - |

FIG. 10

| ONU-ID | #1 | #2 | #3 | #4 | #5 |
|---|---|---|---|---|---|
| ALLOCATED BAND (Mbps) | 100 | 200 | 200 | 300 | 200 |
| REQUESTED BAND (Mbps) | 0 | 300 | 200 | 300 | 300 |
| GROUP INFORMATION | X | X | Y | - | - |

OPTICAL LINE TERMINATION, COMMUNICATION SYSTEM, AND COMMUNICATION CONTROL METHOD

CROSS-REFERENCE TO RELATED APPLICATION

This application is based upon and claims the benefit of priority of the prior Japanese Patent Application No. 2015-255202, filed on Dec. 25, 2015, the entire contents of which are incorporated herein by reference.

FIELD

The embodiments discussed herein are related to an optical line termination, a communication system, and a communication control method.

BACKGROUND

With the rising popularity of mobile terminals such as smartphones, there has been an increase in the number of base stations that connect the mobile terminals to a wireless communication network. Among the base stations, small cells have been increasingly provided in order to make up for local bandwidth shortages of macro-cell base stations that cover macro cells, so that the small cells cover small cells provided to overlap the macro cells (for example, see Japanese Laid-open Patent Publication No. 2011-103570).

Meanwhile, in some cases, a passive optical network (PON) with low installation costs of optical fibers is used as a mobile backhaul network that connects a large number of base stations to an upper-level accommodating station, (for example, see International Publication Pamphlet No. WO2014/103804). For example, IEEE802.3ah of the Institute of Electrical and Electrics Engineers, Inc. defines a technique for a gigabit Ethernet (GE)-PON (Ethernet is a trademark, and the same applies below) of 1 or more Gbps in conformity with the Ethernet.

The PON is a star-type access optical network in which an optical line termination is connected to multiple optical network units via an optical coupler that splits light. The optical line termination is abbreviated as OLT, and the optical network unit is abbreviated as ONU. Employing the PON as the mobile backhaul network may obtain not only an advantage of reduction in the installation costs of optical fibers, but also an advantage in that one OLT may transmit the traffics of multiple base stations.

Moreover, for example, as disclosed in Japanese Laid-open Patent Publication No. 2011-103570 and International Publication Pamphlet No. WO2014/103804, known is a technique in which part of the operations of the base stations and the ONUs is suspended depending on the traffic conditions to reduce the power consumption.

A continuous increase in the number of base stations may result, in the future, in a shortage of the PON that may be utilized as a mobile backhaul network. In one possible way to solve the shortage of the PON, for example, communication channels of the base station may be accommodated within a PON that accommodates therein communication channels (for example, access channels to the Internet) provided in a house of a subscriber, such as an office building.

However, in this case, communication channels of different usage purposes are present in one PON, and multiple ONUs share the bandwidth within the PON, so that it is difficult for an upper-level accommodating station of the base station to know a traffic condition within the PON in the base station. Accordingly, in order to reduce the power consumption, for example, the accommodating station may perform sleep control of the base station which is currently connected to a small number of mobile terminals, but, the sleep control may be inappropriate from the view point of the traffic condition.

The present application was made in view of the above-mentioned problems, and aims to provide an optical line termination, a communication system, and a communication control method that appropriately reduce the power consumption.

SUMMARY

According to an aspect of the invention, an optical line termination includes a detection circuit configured to detect a sleep request from a control apparatus to base stations; a determination circuit configured to determine, when the detection circuit detects the sleep request, whether processing of turning the base stations of requestees by the sleep request into a sleep state in accordance with the sleep request is approvable or not, based on a shortage bandwidth within a passive optical network in a different one of the base stations having a predetermined relationship with the requested base station; and a control circuit configured to discard the sleep request when the determination circuit determines that the processing is not approvable, or transfer the sleep request to the base station of the different requestee when the determination circuit determines that the processing is approval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of an ONU management table;

FIG. 9 is a diagram illustrating one example of a change in an allocated bandwidth depending on the time;

FIG. 10 is a diagram illustrating another example of the ONU management table.

DESCRIPTION OF EMBODIMENTS

Figure 1:
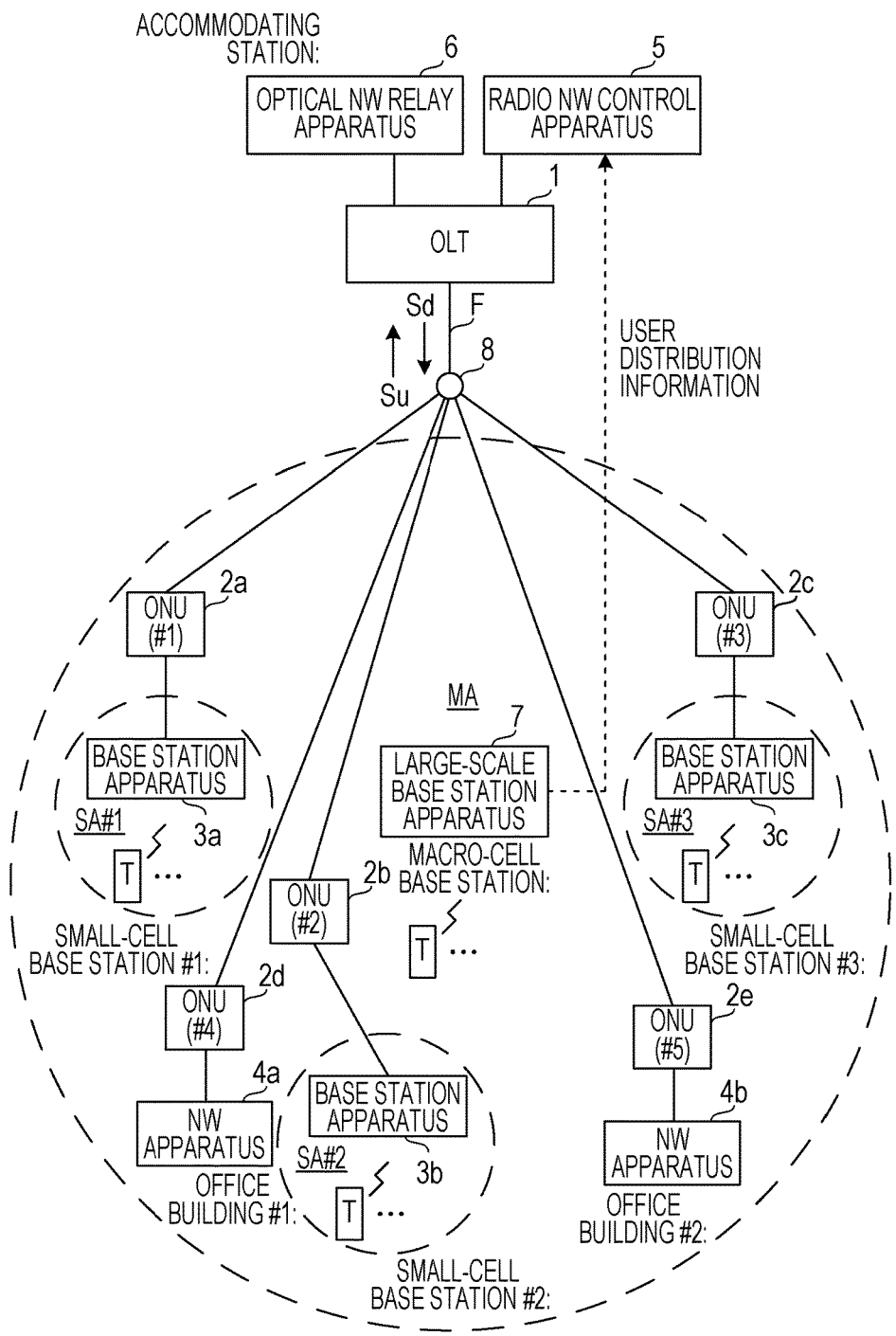
FIG. 1 is a configuration diagram illustrating one example of a communication system.

FIG. 1 is a configuration diagram illustrating one example of a communication system. The communication system includes an optical line termination (OLT) 1, multiple optical network units (ONU) 2a to 2e, multiple base station apparatuses 3a to 3c, a large-scale base station apparatus 7, multiple network (NW) apparatuses 4a and 4b, a radio network (NW) control apparatus 5, an optical network (NW) relay apparatus 6, and multiple mobile terminals T. Note that, the radio NW control apparatus 5 is one example of a control apparatus.

As one example, the OLT 1 and the multiple ONUs 2a to 2e are connected via an optical fiber F and an optical coupler 8 that are transmission paths, and constitute the PON. In other words, the OLT 1 and the multiple ONUs 2a to 2e are connected to the PON. The PON defined in IEEE 802.3ah may be used as one example, but the PON is not limited this. Note that, ONU-IDs (#1 to #5) for identifying the respective ONUs 2a to 2e are assigned to the ONUs 2a to 2e.

In the PON, a direction toward the OLT 1 from the ONUs 2a to 2e is called an "uplink direction", and a direction toward the ONUs 2a to 2e from the OLT 1 is called a "downlink direction". The transmission speed in the uplink direction is, for example, 1.25 (Gbps), and the transmission speed in the downlink direction is, for example, 2.4 (Gbps).

The OLT 1 transmits a downlink signal Sd to each of the ONUs 2a to 2e, and transmits an uplink signal Su to each of the ONUs 2a to 2e the OLT 1. The wavelength of the uplink signal Su is, for example, 1310 (nm), and the wavelength of the downlink signal Sd is, for example, 1490 (nm).

The ONUs (#1 to #3) 2a to 2c are respectively connected to the base station apparatuses 3a to 3c. The base station apparatuses 3a to 3c respectively cover small-cell areas SA#1 to SA#3, and function as small-cell base stations #1 to #3 by establishing a wireless link with the mobile terminal T such as a smartphone.

The large-scale base station apparatus 7 covers a macro-cell area MA, and functions as a macro-cell base station by establishing a wireless link with the mobile terminal T. The small-cell areas SA#1 to SA#3 are provided so as to cover the macro-cell area, so that the base station apparatuses 3a to 3c may make up for the local bandwidth shortage of the large-scale base station apparatus 7.

Meanwhile, the ONUs (#4 and #5) 2d and 2e are respectively connected to the NW apparatuses 4a and 4b that are respectively installed in office buildings #1 and #2. The NW apparatuses 4a and 4b are, for example, routers, and respectively connect the ONUs 2d and 2e to local area networks (LANs) in the office buildings #1 and #2. In this manner, out of the ONUs 2a to 2e, the ONUs 2a to 2c are connected to the base station apparatuses 3a to 3c, and the ONUs 2d and 2e are connected to the NW apparatuses 4a and 4b, respectively. Note that, the NW apparatuses 4a and 4b are examples of apparatuses other than the base station apparatuses 3a to 3c.

The ONUs 2a to 2e are connected to the optical coupler 8 via separate optical fibers F, and the optical coupler 8 is connected to the OLT 1 via one optical fiber F. Therefore, the optical coupler is disposed at a suitable position in accordance with positions of the base station apparatuses 3a to 3c and the office buildings #1 and #2 to reduce the installation costs of the optical fibers F by disposing.

Note that, in the embodiment, the five ONUs 2a to 2e are connected to the OLT 1, but the number of ONUs connected is not limited. For example, when a large number of ONUs, such as 64 ONUs, are connected to the OLT 1, the optical fiber F may be branched stepwise by multiple optical couplers 8 to connect the ONUs to the OLT 1.

The OLT 1 is connected to the optical NW relay apparatus 6 and the radio NW control apparatus 5 at the upper-level.

The optical NW relay apparatus 6 and the radio NW control apparatus 5 are installed in, for example, different accommodating stations or the same accommodating station.

The optical NW relay apparatus 6 is, for example, an edge router, and communicates with the NW apparatuses 4a and 4b via the PON to relay communication between the NW apparatuses 4a and 4b and the Internet, for example. Moreover, the radio NW control apparatus 5 communicates with the base station apparatuses 3a to 3c via the PON to control wireless communication of the mobile terminals T. In other words, the PON accommodates therein access channels to the Internet in the office buildings #1 and #2 and communication channels of the base station apparatuses 3a to 3c.

In the PON, the optical fiber F between the OLT 1 and the optical coupler 8 is shared among the multiple ONUs 2a to 2e, so that a time division multiplex system is used as a transmission method in the uplink direction and in the downlink direction.

Figure 2:
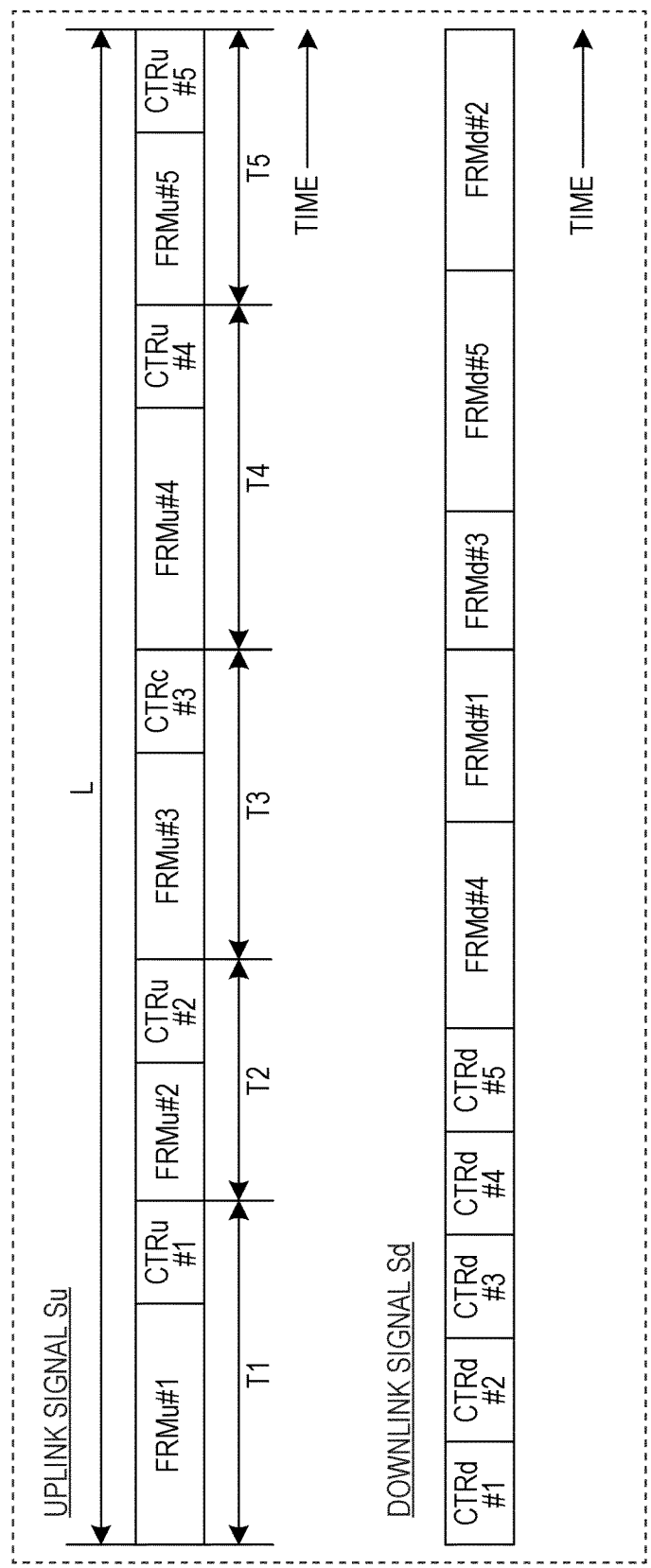
FIG. 2 is a configuration diagram illustrating one example of an uplink signal and a downlink signal.

FIG. 2 is a configuration diagram illustrating one example of the uplink signal Su and the downlink signal Sd. The uplink signal Su includes uplink user frames FRMu #1 to #5 and uplink control signals CTRu #1 to #5, which are respectively transmitted from the ONUs 2a to 2e. Moreover, the downlink signal Sd includes downlink user frames FRMd #1 to #5 and downlink control signals CTRd #1 to #5 in which the ONUs 2a to 2e are respectively set as destinations. Note that, examples of forms of the uplink user frames FRMu #1 to #5, the uplink control signals CTRu #1 to #5, the downlink user frames FRMd #1 to #5, and the downlink control signals CTRd #1 to #5 may include, for example, Ethernet frames, but are not limited thereto.

In the downlink direction, the OLT 1 incorporates data signals, which are destined for the base station apparatuses 3a to 3c and are received from the radio NW control apparatus 5, into the downlink user frames FRMd #1 to #3, and transmits the data signals in chronological order, for example. Moreover, the OLT 1 incorporates data signals, destined for the NW apparatuses 4a and 4b and received from the optical NW relay apparatus 6, in the downlink user frames FRMd #4 and #5, and transmits the data signals in chronological order, for example. Therefore, the bandwidth control of the ONUs 2a to 2e is not performed in the downlink direction.

Moreover, the OLT 1 generates the downlink control signals CTRd #1 to #5 in a certain cycle, for example, inserts the downlink control signals CTRd #1 to #5 between the downlink user frames FRMd #1 to #5, and transmits the resultant signals respectively to the ONUs 2a to 2e. Each of the downlink control signals CTRd #1 to #5 contains, for example, a specification of a transmission period of the uplink signal Su, a sleep instruction instructing each of the ONUs 2a to 2e to shift to a sleep state, an activation instruction instructing each of the ONUs 2a to 2e to be activated, and the like.

The OLT 1 assigns the ONU-IDs serving as destinations of the ONUs 2a to 2e to the downlink user frames FRMd #1 to #5 and the downlink control signals CTRd #1 to #5. The ONUs 2a to 2e receive a common downlink signal Sd, so that the ONUs 2a to 2e respectively acquire the downlink user frames FRMd #1 to #5 and the downlink control signals CTRd #1 to #5 to which the ONU-IDs of the ONUs 2a to 2e are assigned, from the downlink signal Sd.

With this, the ONUs 2a to 2c respectively receive data signals of the radio NW control apparatus 5 from the downlink user frames FRMd #1 to #3, and the ONUs 2d and 2e respectively receive data signals of the optical NW relay apparatus 6 from the downlink user frames FRMd #4 and #5.

Further, the OLT 1 may perform encryption processing such as an advanced encryption standard (AES) method on the downlink signal Sd so as to reduce the downlink user frames FRMd #1 to #5 destined for other ONUs 2a to 2e to be improperly acquired by a malicious user.

Meanwhile, in the uplink direction, the ONUs 2a to 2c respectively incorporates data signals received from the base station apparatuses 3a to 3c in the uplink user frames FRMu #1 to #3, and transmit the uplink user frames FRMu #1 to #3 to the OLT 1 within transmission periods in which the OLT 1 is specified. Moreover, the ONUs 2d and 2e respectively incorporate data signals received from the NW apparatuses 4a and 4b in the uplink user frames FRMu #4 and #5, and transmit the uplink user frames FRMu #4 and #5 to the OLT 1 within transmission periods in which the OLT 1 is specified. Here, the transmission period indicates a time domain when the uplink signal Su for each of the ONUs 2a to 2e may be transmitted at a time (timer value) synchronized between OLT 1 and the ONUs 2a to 2e, in other words a transmission start time and a transmission end time.

Moreover, the ONUs 2a to 2e respectively generate the uplink control signals CTRu #1 to #5, and transmit the uplink control signals CTRu #1 to #5 together with the uplink user frames FRMu #1 to #5, to the OLT 1. The uplink control signals CTRu #1 to #5 each contain a request value of a bandwidth of the uplink signal Su with respect to the OLT 1, and the like.

The ONUs 2a to 2e respectively assign the ONU-IDs of the ONUs 2a to 2e to the uplink user frames FRMu #1 to #5 and the uplink control signals CTRu #1 to #5. Therefore, the OLT 1 may acquire the uplink user frames FRMu #1 to #5 and the uplink control signals CTRu #1 to #5, for each of the ONUs 2a to 2e, based on the ONU-IDs, from the uplink signals Su.

Moreover, as for transmission of the uplink signals Su, the OLT 1 instructs the ONUs 2a to 2e in different transmission periods. Therefore, the uplink user frames FRMu #1 to #5 and the uplink control signals CTRu #1 to #5 are respectively transmitted in different transmission periods T1 to T5 within a transmission cycle L. Accordingly, the uplink signals Su of the respective ONUs 2a to 2e de not collide with one another.

The OLT 1 dynamically controls the bandwidths of the uplink signals Su of the respective ONUs 2a to 2e. More specifically, the OLT 1 allocates, in accordance with request values of the bandwidth included in the uplink control signals CTRu #1 to #5, uplink bandwidths to the ONUs 2a to 2e, and instructs the ONUs 2a to 2e in transmission periods in accordance with the allocated results. Therefore, the transmission periods T1 to T5 of the respective ONUs 2a to 2e dynamically change.

In this manner, the bandwidth within the PON is shared by the multiple ONUs 2a to 2e, and the bandwidth allocated to each of the ONUs 2a to 2e dynamically changes.

With reference to FIG. 1 again, the radio NW control apparatus 5 acquires user distribution information indicating distribution of the mobile terminals T of users within the macro-cell area MA, from the large-scale base station apparatus 7. Further, the radio NW control apparatus 5 and the large-scale base station apparatus 7 are connected to each other via the PON or a network of another form.

The radio NW control apparatus 5 detects one small-cell area in which the number of users is small out of the small-cell areas SA#1 to SA#3, based on the user distribution information. In other words, the radio NW control apparatus 5 detects one base station apparatus in which the number of wireless links is small out of the base station apparatuses 3a to 3c. The radio NW control apparatus 5 transmits a sleep request to the detected base station apparatus 3a to 3c. Upon receiving the sleep request, the base station apparatus 3a to 3c shifts to a sleep state by stopping a part of an operation.

This reduces the power consumption of the base station apparatus 3a to 3c. Moreover, in this process, the OLT 1 sleep controls the ONU 2a to 2c connected to the base station apparatus 3a to 3c having shifted to the sleep state, so that the power consumption of the ONU 2a to 2c is also reduced.

However, as described above, communication channels of different usage purposes are present together within the PON, and the multiple ONUs 2a to 2e share the bandwidth within the PON, so that it is difficult for the radio NW control apparatus 5 to know the traffic conditions within the PON in the base station apparatuses 3a to 3c. Accordingly, a sleep request from the radio NW control apparatus 5 may be inappropriate from the view point of the traffic conditions in some cases.

Therefore, the OLT 1 detects a sleep request, and determines whether the sleep is approvable or not, based on a shortage bandwidth within the PON in a different base station apparatus 3a to 3c having a predetermined relationship with the base station apparatus 3a to 3c of a requestee. The requestee is to receive a sleep request requested by the control apparatus 5. Here, the base station apparatus 3a to 3c of the requestee and the different base station apparatus 3a to 3c have a relationship in which the base station apparatus 3a to 3c of the requestee may cover the traffics of the different base station apparatus 3a to 3c. In the following example, a base station apparatus 3a to 3c positioned close to the base station apparatus 3a to 3c of the requestee is used as the different base station apparatus 3a to 3c, for example, but the different base station apparatus 3a to 3c is not limited to this.

If the OLT 1 determines that the sleep processing is not approvable, the OLT 1 discards the sleep request, and notifies the radio NW control apparatus 5 of sleep prohibition. On the other hand, if the OLT 1 determines that the sleep processing is approvable, the OLT 1 transfers the sleep request to the base station apparatus 3a to 3c of the requestee, and makes the ONU 2a to 2c connected to the base station apparatus 3a to 3c be in a sleep state. This appropriately reduces the power consumption of the ONU 2a to 2c and the base station apparatus 3a to 3c. The configuration of the OLT 1 and the ONUs 2a to 2e will be described below.

Figure 3:
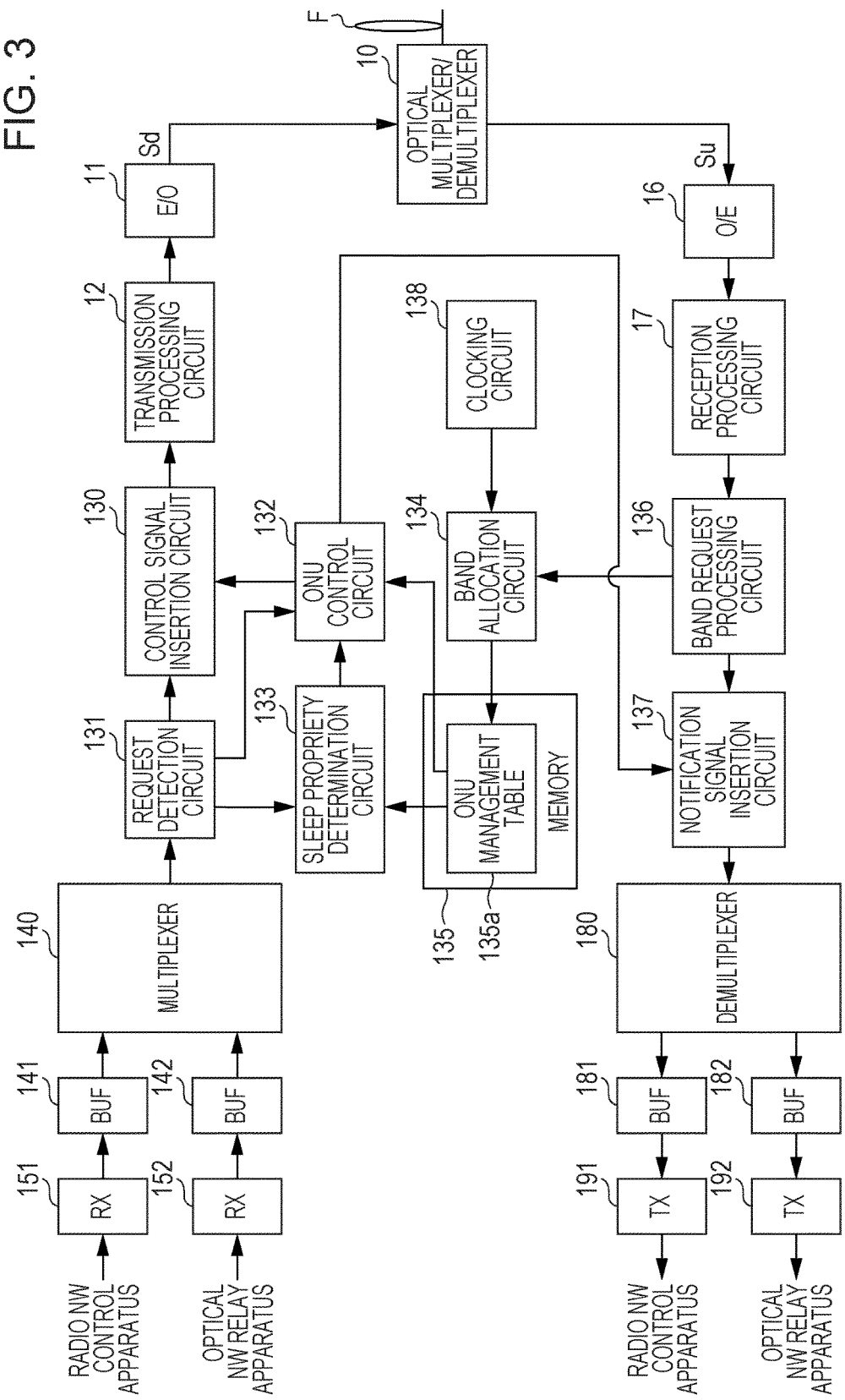
FIG. 3 is a configuration diagram illustrating one example of an OLT.

FIG. 3 is a configuration diagram illustrating one example of the OLT 1. The OLT 1 includes an optical multiplexer/demultiplexer 10, a semiconductor laser 11, a transmission processing circuit 12, a control signal insertion circuit 130, a request detection circuit 131, an ONU control circuit 132, a sleep propriety determination circuit 133, a bandwidth allocation circuit 134, a memory 135 that holds an ONU management table 135a, and a clocking circuit 138.

In addition, the OLT 1 includes a photo detector (0/E) 16, a reception processing circuit 17, a bandwidth request processing circuit 136, a notification signal insertion circuit 137, a multiplexer 140, a demultiplexer 180, buffers (BUF) 141, 142, 181, and 182, receivers (Rx) 151 and 152, and transmitters (Tx) 191 and 192. Processing of the uplink signal Su, processing of the downlink signal Sd, and control processing will be sequentially described below.

The optical multiplexer/demultiplexer 10 is, for example, a wavelength division multiplex (WDM) coupler, and is inputted and outputs light signals of different wavelengths from and to different ports. More specifically, the optical multiplexer/demultiplexer 10 outputs the uplink signal Su inputted from the optical fiber F to the photo detector 16, and outputs the downlink signal Sd inputted from the semiconductor laser 11 to the optical fiber F. This allows the optical transmission between the OLT 1 and the multiple ONUs 2a to 2e through the single-core optical fiber F.

The photo detector (PD, for example) 16 converts the uplink signal Su inputted from the optical multiplexer/demultiplexer 10 into an electric signal, and outputs the electric signal to the reception processing circuit 17.

The reception processing circuit 17 performs processing on a physical layer and a media access control (MAC) layer with respect to the uplink signal Su. The reception processing circuit 17 separates the uplink user frames FRMu #1 to #5 and the uplink control signals CTRu #1 to #5 for each of the ONUs 2a to 2e, from the uplink signal Su, based on the ONU-IDs, for example.

Moreover, the reception processing circuit 17 assigns, based on the ONU-IDs, as transfer destinations of the uplink user frames FRMu #1 to #5, transfer information indicating either one of the radio NW control apparatus 5 and the optical NW relay apparatus 6 to each of the uplink user frames FRMu #1 to #5. The reception processing circuit 17 outputs the separated uplink user frames FRMu #1 to #5 and the separated uplink control signals CTRu #1 to #5 to the bandwidth request processing circuit 136.

The bandwidth request processing circuit 136 processes the uplink control signals CTRu #1 to #5 inputted from the reception processing circuit 17. More specifically, the bandwidth request processing circuit 136 acquires request values of the bandwidth for the respective ONUs 2a to 2e from the uplink control signals CTRu #1 to #5, and outputs the request values of the bandwidth to the bandwidth allocation circuit 134. The bandwidth request processing circuit 136 outputs the uplink user frames FRMu #1 to #5 inputted from the reception processing circuit 17 to the notification signal insertion circuit 137.

The notification signal insertion circuit 137 inserts a notification signal inputted from the ONU control circuit 132 into the uplink user frames FRMu #1 to #5, and outputs the uplink user frames FRMu #1 to #5 to the demultiplexer 180. When the sleep propriety determination circuit 133 determines that the sleep processing on the base station apparatus 3a to 3c targeted by the received sleep request is not approvable, the notification signal notifies the radio NW control apparatus 5 of the above determination, as described later. Further, for example, an identifier of a unique pattern is assigned to the notification signal, and the notification signal is distinguished from the other uplink user frames FRMu #1 to #5 by the identifier.

The demultiplexer 180 separately outputs the uplink user frames FRMu #1 to #5 into the buffer 181 or the buffer 182 in accordance with transfer information. More specifically, the demultiplexer 180 outputs the uplink user frames FRMu #1 to #3 to the buffer 181, and outputs the uplink user frames FRMu #4 and #5 to the buffer 182. Moreover, the demultiplexer 180 identifies the abovementioned notification signal by the identifier, and outputs the notification signal to the buffer 181.

The buffer 181 stores therein the uplink user frames FRMu #1 to #3 and the notification signal to be transmitted to the radio NW control apparatus 5, and the buffer 182 stores therein the uplink user frames FRMu #4 and #5 to be transmitted to the optical NW relay apparatus 6.

The transmitter 191 reads out the uplink user frames FRMu #1 to #3 and the notification signal from the buffer 181. The transmitter 191 acquires data signals of the base station apparatuses 3a to 3c from the uplink user frames FRMu #1 to #3, and transmits the data signals together with the notification signal to the radio NW control apparatus 5. Moreover, the transmitter 192 reads out the uplink user frames FRMu #4 and #5 from the buffer 182. The transmitter 192 acquires data signals of the NW apparatuses 4a and 4b from the uplink user frames FRMu #4 and #5, and transmits the data signals to the optical NW relay apparatus 6.

Moreover, the receiver 151 receives data signals from the radio NW control apparatus 5. The receiver 151 incorporates the data signals in the downlink user frames FRMd #1 to #3, and outputs the downlink user frames FRMd #1 to #3 to the buffer 141. The buffer 141 stores therein the downlink user frames FRMd #1 to #3.

The receiver 152 receives data signals from the optical NW relay apparatus 6. The receiver 152 incorporates the data signals in the downlink user frames FRMd #4 and #5, and outputs the downlink user frames FRMd #4 and #5 to the buffer 142. The buffer 142 stores therein the downlink user frames FRMd #4 and #5.

The multiplexer 140 reads out the downlink user frames FRMd #1 to #3 from the buffer 141, reads out the downlink user frames FRMd #4 and #5 from the buffer 142, and multiplexes and outputs the downlink user frames FRMd #1 to #3 and the downlink user frames FRMd #4 and #5 to the request detection circuit 131. Further, the multiplexer 140 alternately reads out the buffers 141 and 142, for example, to assure the fairness of the respective bandwidths of the downlink user frames FRMd #1 to #5.

The request detection circuit 131 is one example of a detection circuit, and detects a sleep request from the radio NW control apparatus 5 to the base station apparatus 3a to 3c. More specifically, the request detection circuit 131 detects a sleep request from the downlink user frames FRMd #1 to #3 based on an identifier thereof, for example. The request detection circuit 131 extracts the detected sleep request from the downlink user frames FRMd #1 to #3, and outputs the detected sleep request to the sleep propriety determination circuit 133. Further, the sleep request includes requestee information indicating the base station apparatus 3a to 3c of the requestee.

The control signal insertion circuit 130 inserts the downlink control signals CTRd #1 to #5, a sleep request, and an activation request, which are inputted from the ONU control circuit 132, between the downlink user frames FRMd #1 to #5 inputted from the request detection circuit 131, and outputs them to the transmission processing circuit 12. Here, when the control signal insertion circuit 130 inserts a sleep request or an activation request, the control signal insertion circuit 130 incorporates the sleep request or the activation request into any one of the downlink user frames FRMd #1 to #3, and inserts the downlink user frame FRMd #1 to #3.

The transmission processing circuit 12 performs processing on a physical layer and an MAC layer of the downlink signal Sd. The transmission processing circuit 12 respectively assigns ONU-IDs of the ONUs 2a to 2e serving as transmission destinations to the downlink user frames FRMd #1 to #5 and the downlink control signals CTRd #1 to #5 to configure the downlink signal Sd. The transmission processing circuit 12 outputs the configured downlink signal Sd to the semiconductor laser 11.

The semiconductor laser 11 is, for example, a laser diode (LD), and converts the downlink signal Sd inputted from the transmission processing circuit 12 as an electric signal into an light signal, and outputs the downlink signal Sd as the light signal to the optical multiplexer/demultiplexer 10. With this, the downlink signal Sd is transmitted to the ONUs 2a to 2e via the optical fiber F.

The bandwidth allocation circuit 134 is one example of an allocation circuit, and allocates the bandwidth within the PON to each of the ONUs 2a to 2e in response to a request of the bandwidth from each of the ONUs 2a to 2e. More specifically, the bandwidth allocation circuit 134 calculates the bandwidth to be allocated to each of the ONUs 2a to 2e in accordance with a predetermined algorithm, based on a request value of the bandwidth of each of the ONUs 2a to 2e inputted from the bandwidth request processing circuit 136. Further, the bandwidth allocation circuit 134 sets a total of the bandwidth to be allocated to each of the ONUs 2a to 2e to 1 (Gbps), for example, based on the uplink transmission speed.

The bandwidth allocation circuit 134 writes the request value of the bandwidth of each of the ONUs 2a to 2e and the allocated bandwidth in the ONU management table 135a held by the memory 135. Note that, the memory 135 is one example of a holding circuit.

FIG. 4 illustrates one example of the ONU management table 135a. The "allocated bandwidth" indicates the bandwidth that is allocated to the corresponding ONU 2a to 2e for each ONU-ID. The "requested bandwidth" indicates the bandwidth that is requested by the corresponding ONU 2a to 2e for each ONU-ID, in other words, a request value of the bandwidth.

Moreover, "position information" is information that is set only to the ONUs 2a to 2c respectively connected to the base station apparatuses 3a to 3c, and indicates a position of each of the base station apparatuses 3a to 3c. Therefore, position information P1 to P3 is respectively set only to ONU-IDs #1 to #3, and no position information on the ONU-IDs #4 and #5 of the ONUs 2d and 2e respectively connected to the NW apparatuses 4a and 4b is set (see "-" (hyphen)).

Examples of the position information P1 to P3 include, for example, the longitude and latitude in an installed place of each of the base station apparatuses 3a to 3c, however, the position information P1 to P3 is not limited thereto. Each position information P1 to P3 is registered in advance in the ONU management table 135a when an operation of the corresponding ONU 2a to 2e is started. Each position information P1 to P3 is used for the determination processing in the sleep propriety determination circuit 133 with the allocated bandwidth and the requested bandwidth.

When the request detection circuit 131 detects a sleep request, the sleep propriety determination circuit 133 determines whether sleep processing of turning the base station apparatus 3a to 3c of the requestee into a sleep state in accordance with the sleep request is approvable or not, based on a shortage bandwidth within the PON in a different base station apparatus 3a to 3c having a predetermined relationship with the base station apparatus 3a to 3c of the requestee by the sleep request. Note that, the sleep propriety determination circuit 133 is one example of a determination circuit.

The sleep propriety determination circuit 133 determines whether the sleep processing is approvable or not based on the ONU management table 135a. More specifically, based on the position information P1 to P3 in the ONU management table 135a, the sleep propriety determination circuit 133 searches for a different base station apparatus 3a to 3c within a predetermined distance D from the base station apparatus 3a to 3c of the requestee by the sleep request. If the different base station apparatus 3a to 3c is not searched out, the sleep propriety determination circuit 133 determines that the sleep processing is approvable.

If the different base station apparatus 3a to 3c is searched out, the sleep propriety determination circuit 133 acquires a requested bandwidth and an allocated bandwidth of the ONU 2a to 2c connected to the base station apparatus 3a to 3c from the ONU management table 135a, and compares the requested bandwidth and the allocated bandwidth with each other. If the requested bandwidth is equal to or more than the allocated bandwidth, for example, the sleep propriety determination circuit 133 determines that the sleep processing is not approvable. In other words, the sleep propriety determination circuit 133 determines that the sleep processing is not approvable when the different base station apparatus 3a to 3c close to the base station apparatus 3a to 3c of the requestee by the sleep request has congested traffics. On the other hand, if the requested bandwidth is less than the allocated bandwidth, the sleep propriety determination circuit 133 determines that the sleep processing is approvable.

The sleep propriety determination circuit 133 outputs a determination result on whether the sleep processing is approvable or not, together with the sleep request to the ONU control circuit 132. The ONU control circuit 132 processes the sleep request in accordance with the determination result. Note that, the ONU control circuit 132 is one example of a control circuit.

More specifically, when the sleep propriety determination circuit 133 determines that the sleep processing is not approvable, the ONU control circuit 132 discards the sleep request, and outputs a notification signal notifying that the sleep processing is canceled to the notification signal insertion circuit 137. Therefore, the notification signal is transmitted to the radio NW control apparatus 5.

With this, the base station apparatus 3a to 3c of the requestee is not in the sleep state, so that the base station apparatus 3a to 3c of the requestee may cover the traffics of the different base station apparatus 3a to 3c in the vicinity. In other words, the base station apparatus 3a to 3c of the requestee may cover the traffics of the different base station apparatus 3a to 3c by establishing a wireless link with the mobile terminal T having been wireless linked with the different base station apparatus 3a to 3c.

For example, when the request detection circuit 131 detects a sleep request to the ONU (#1) 2a, the sleep propriety determination circuit 133 refers to the ONU management table 135a, and compares the position information P1 on the base station apparatus 3a that is connected to the ONU (#1) 2a of a requestee with the other position information P2 and P3 on the base station apparatuses 3b and 3c of the different ONUs (#2 and #3) 2b and 2c. As a result of the comparison, for example, if the ONU (#2) 2b is present within the predetermined distance D from the ONU (#1) 2a, the sleep propriety determination circuit 133 compares a requested bandwidth and an allocated bandwidth of the ONU (#2) 2b with each other.

The sleep propriety determination circuit 133 determines that the sleep processing is not approvable if the requested bandwidth the allocated bandwidth is obtained, whereas determines that the sleep processing is approvable if the requested bandwidth <the allocated bandwidth is obtained. In the example of FIG. 4, the requested bandwidth ≥the allocated bandwidth is obtained, the base station apparatus 3a of the ONU (#1) 2a is not in the sleep state, and may cover the congested traffics of the different base station apparatus 3b in the vicinity (within the distance D).

On the other hand, for example, if the base station apparatus 3c of the ONU (#3) 2c is present within the predetermined distance D, the requested bandwidth <the allocated bandwidth is obtained, so that the base station apparatus 3a of the ONU (#1) 2a is in the sleep state. In other words, the traffics of the base station apparatus 3c is not congested, so that the base station apparatus 3a of the ONU (#1) 2a does not have to cover the traffics of the base station apparatus 3c, and may be in the sleep state. This reduces the power consumption of the base station apparatus 3a. Moreover, in this case, the ONU (#3) 2c is also turned into the sleep state, so that the power consumption is further reduced.

Moreover, when the sleep propriety determination circuit 133 determines that the sleep processing is approvable, the ONU control circuit 132 transfers the sleep request to the base station apparatus 3a to 3c of the requestee. More specifically, the ONU control circuit 132 outputs the sleep request to the control signal insertion circuit 130. Further, the control signal insertion circuit 130 incorporates the sleep request into the downlink user frame FRMd of the corresponding ONU 2a to 2c.

In addition, when the ONU control circuit 132 transfers the sleep request, the ONU control circuit 132 performs wait processing during a predetermined period of time, and thereafter turns into the sleep state the ONU 2a to 2c connected to the base station apparatus 3a to 3c of the requestee by the sleep request. More specifically, the ONU control circuit 132 generates a downlink control signal CTRd including a sleep instruction to the corresponding ONU 2a to 2c, and outputs the downlink control signal CTRd to the control signal insertion circuit 130.

In this manner, the sleep propriety determination circuit 133 determines whether the sleep processing is approvable or not on the base station apparatus 3a to 3c targeted by the received sleep request, based on a shortage bandwidth within the PON in the different base station apparatus 3a to 3c positioned within the predetermined distance D from the base station apparatus 3a to 3c targeted by the received sleep request. Therefore, the OLT 1 may appropriately perform the sleep processing based on the distance among the base station apparatuses 3a to 3c.

Moreover, the ONU control circuit 132 decides, based on the allocated bandwidth written in the ONU management table 135a, transmission periods of the uplink signals Su of the ONUs 2a to 2c, and generates and outputs downlink control signals CTRd including specifications of the transmission periods, to the control signal insertion circuit 130. This controls the uplink bandwidths of the ONUs 2a to 2c.

The clocking circuit 138 measures a time, and notifies the bandwidth allocation circuit 134 of the time. The bandwidth allocation circuit 134 may change the priority of bandwidth allocation among the ONUs 2a to 2c in accordance with the time, as is described later.

Moreover, the request detection circuit 131 detects an activation request to any one of the base station apparatuses 3a to 3c from the radio NW control apparatus 5, and outputs the activation request to the ONU control circuit 132. When the activation request is inputted, the ONU control circuit 132 turns into an active state the corresponding ONU 2a to 2c connected to the base station apparatus 3a to 3c of the requestee by the activation request. More specifically, the ONU control circuit 132 generates a downlink control signal CTRd including an activation instruction to the corresponding ONU 2a to 2c, and outputs the downlink control signal CTRd to the control signal insertion circuit 130.

When the ONU control circuit 132 outputs a downlink control signal CTRd including an activation instruction, the ONU control circuit 132 transfers the activation request to the base station apparatus 3a to 3c of the requestee after performing wait processing during a predetermined period of time. More specifically, the ONU control circuit 132 outputs the activation request to the control signal insertion circuit 130. Further, the control signal insertion circuit 130 incorporates the activation request into the downlink user frame FRMd of the corresponding ONU 2a to 2c.

Figure 5:
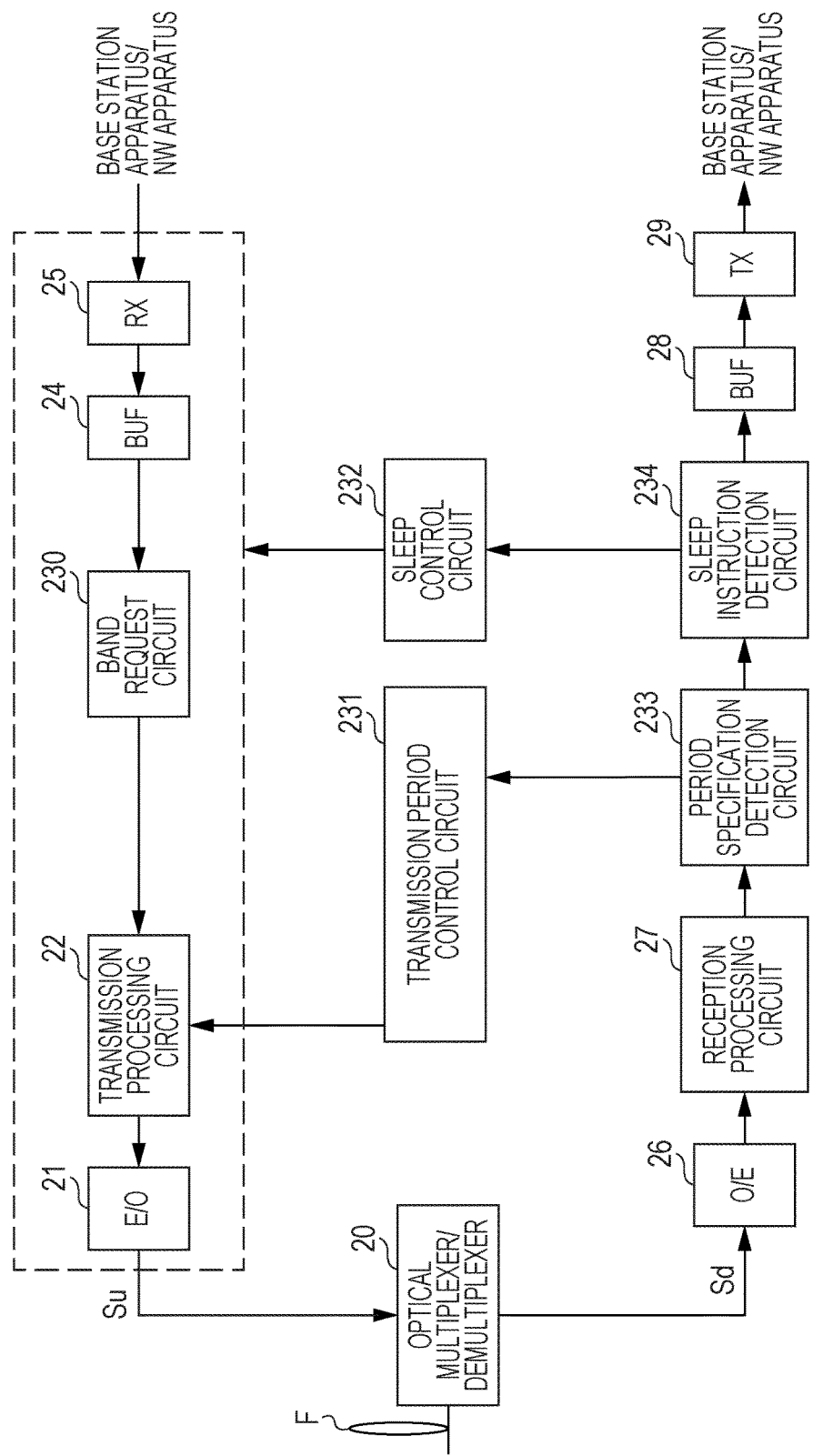
FIG. 5 is a configuration diagram illustrating one example of an ONU.

FIG. 5 is a configuration diagram illustrating one example of the ONUs 2a to 2e. Each of the ONUs 2a to 2e includes an optical multiplexer/demultiplexer 20, a semiconductor laser 21, a transmission processing circuit 22, a bandwidth request circuit 230, a transmission period control circuit 231, a sleep control circuit 232, buffers 24 and 28, a receiver 25. Each of the ONUs 2a to 2e further includes a photo detector 26, a reception processing circuit 27, a period specification detection circuit 233, a sleep instruction detection circuit 234, and a transmitter 29. Processing of the downlink signal Sd, processing of the uplink signal Su, and control processing will be sequentially described below.

The optical multiplexer/demultiplexer 20 is, for example, a WDM coupler, and is inputted and outputs light signals of different wavelengths from and to different ports. More specifically, the optical multiplexer/demultiplexer 20 outputs the uplink signal Su inputted from the optical fiber F to the photo detector 26, and outputs the downlink signal Sd inputted from the semiconductor laser 21 to the optical fiber F.

The photo detector 26 is, for example, a PD, converts the downlink signal Sd inputted from the optical multiplexer/demultiplexer 20 into an electric signal, outputs the electric signal to the reception processing circuit 27.

The reception processing circuit 27 performs processing on a physical layer and an MAC layer with respect to the downlink signal Sd. The reception processing circuit 27 separates the downlink user frame FRMd and the downlink control signal CTRd of the own apparatus based on the ONU-ID, from the downlink signal Sd, for example. For example, in a case of the ONU (#1) 2a in which the ONU-ID is "1", the reception processing circuit 27 separates the downlink user frame FRMd #1 and the downlink control signal CTRd #1 from the downlink signal Sd. The reception processing circuit 27 outputs the separated downlink user frame FRMd and the separated downlink control signal CTRd to the period specification detection circuit 233.

The period specification detection circuit 233 acquires a specification of a transmission period of the uplink signal Su from the downlink control signal CTRd, and outputs the specification to the transmission period control circuit 231. The period specification detection circuit 233 outputs a different downlink user frame FRMd and a different downlink control signal CTRd to the sleep instruction detection circuit 234.

The sleep instruction detection circuit 234 acquires a sleep instruction to the own apparatus from the downlink control signal CTRd, and outputs the sleep instruction to the sleep control circuit 232. Moreover, the sleep instruction detection circuit 234 acquires an activation instruction to the own apparatus from the downlink control signal CTRd, and outputs the activation instruction to the sleep control circuit 232.

The sleep instruction detection circuit 234 outputs the different downlink user frame FRMd to the buffer 28. The buffer 28 stores therein the downlink user frame FRMd to be transmitted to the base station apparatuses 3a to 3c or the NW apparatuses 4a and 4b.

The transmitter 29 reads out the downlink user frame FRMd from the buffer 28. The transmitter 29 acquires a data signal from the downlink user frame FRMd, and transmits the data signal to the base station apparatus 3a to 3c or the NW apparatus 4a and 4b.

Moreover, the receiver 25 receives data signal from the base station apparatus 3a to 3c or the NW apparatus 4a and 4b. The receiver 25 incorporates the data signal in the uplink user frame FRMu, and outputs the uplink user frame FRMu to the buffer 24. For example, in a case of the ONU (#1) 2a, the receiver 25 incorporates a data signal in the uplink user frame FRMu #1. The buffer 24 stores therein the uplink user frame FRMu.

The bandwidth request circuit 230 detects the data amount of the uplink user frame FRMu in the buffer 24, and decides a request value of the bandwidth in accordance with the data amount. The bandwidth request circuit 230 generates an uplink control signal CTRu including the decided request value of the bandwidth, and outputs the uplink control signal CTRu to the transmission processing circuit 22. Moreover, the bandwidth request circuit 230 reads out a different uplink user frame FRMu from the buffer 24, and outputs the different uplink user frame FRMu to the transmission processing circuit 22.

The transmission processing circuit 22 performs processing on a physical layer and an MAC layer of the uplink signal Su. The transmission processing circuit 22 assigns an ONU-ID of the own apparatus to the uplink user frame FRMu and the uplink control signal CTRu to configure the uplink signal Su. The transmission processing circuit 22 outputs the uplink signal Su to the semiconductor laser 21 during a transmission period controlled by the transmission period control circuit 231.

The semiconductor laser 21 is, for example, an LD, and converts the uplink signal Su inputted from the transmission processing circuit 22 as an electric signal into a light signal, and outputs the uplink signal Su as the light signal to the optical multiplexer/demultiplexer 20. With this, the uplink signal Su is transmitted to the OLT 1 via the optical fiber F.

When a sleep instruction is inputted from the sleep instruction detection circuit 234, the sleep control circuit 232 stops the power supply to the semiconductor laser 21, the transmission processing circuit 22, the bandwidth request circuit 230, the buffer 24, and the receiver 25 (see the inside of a frame surrounded by the dashed line). With this, the ONU 2a to 2e temporarily stops the transmission of the uplink signal Su, so that the power consumption is reduced.

Meanwhile, when an activation instruction is inputted from the sleep instruction detection circuit 234, the sleep control circuit 232 resumes the power supply to the semiconductor laser 21, the transmission processing circuit 22, the bandwidth request circuit 230, the buffer 24, and the receiver 25. With this, the ONU 2a to 2e may resume the transmission of the uplink signal Su.

Figure 6:
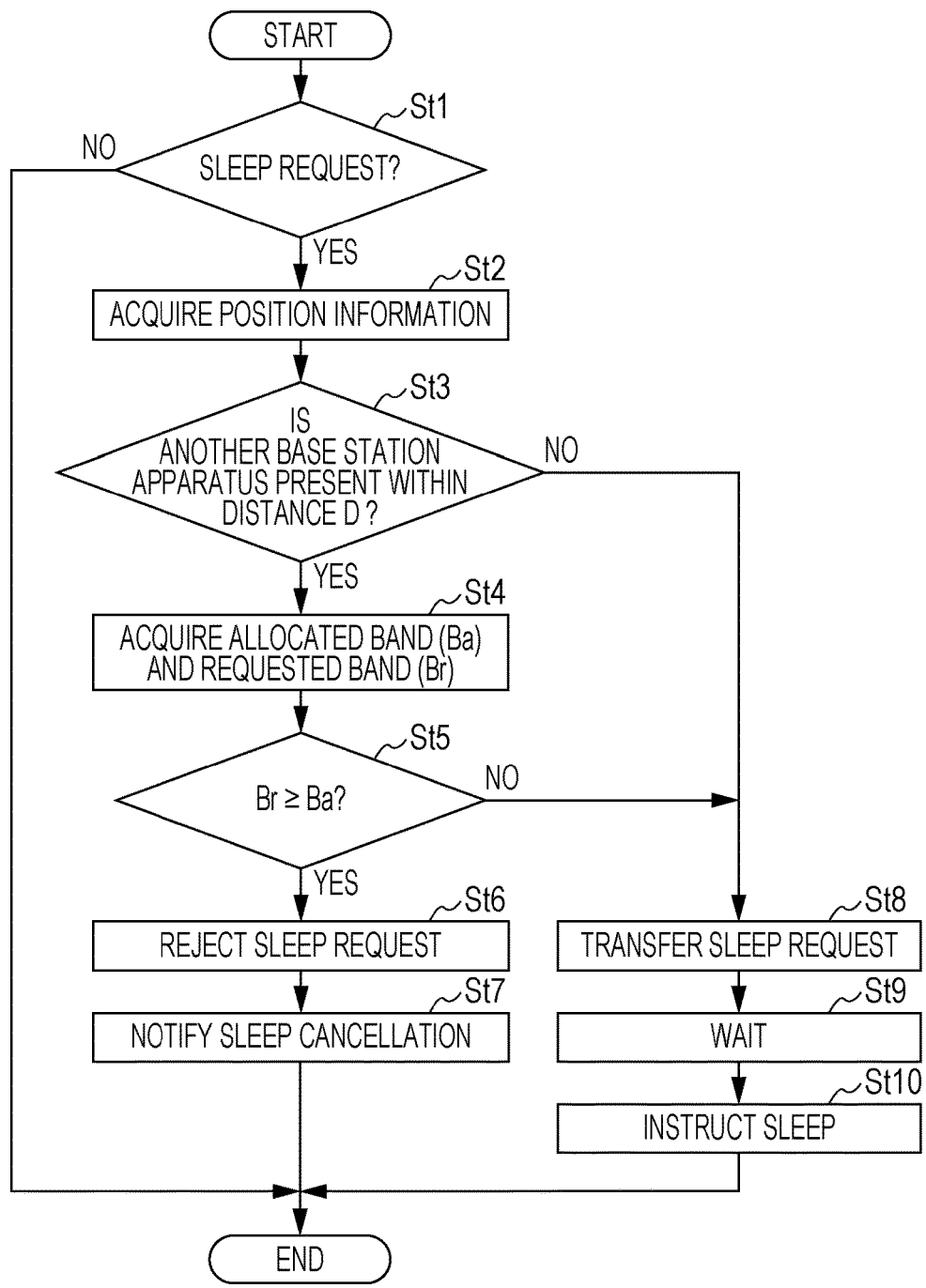
FIG. 6 is a flowchart illustrating one example of processing of a sleep request by the OLT.

FIG. 6 is flowchart illustrating one example of processing of a sleep request by the OLT 1. The request detection circuit 131 determines whether a sleep request is detected (Step St1). If the sleep request is not detected (No at Step St1), the request detection circuit 131 ends the processing.

If the sleep request is detected (Yes at Step St1), the sleep propriety determination circuit 133 acquires position information P1 to P3 on the base station apparatuses 3a to 3c, from the ONU management table 135a (Step St2). Next, the sleep propriety determination circuit 133 determines the presence or absence of a different (another) base station apparatus 3a to 3c positioned within the predetermined distance D from the base station apparatus 3a to 3c of the requestee, based on the position information P1 to P3 (Step St3). In other words, based on the position information P1 to P3, the sleep propriety determination circuit 133 searches for a different base station apparatus 3a to 3c positioned within the predetermined distance D from the base station apparatus 3a to 3c of the requestee.

If the different base station apparatus 3a to 3c is not searched out (No at Step St3), the sleep propriety determination circuit 133 determines that the sleep processing is approvable, and the ONU control circuit 132 transfers the sleep request to the base station apparatus 3a to 3c of the requestee (Step St8). In this case, as described above, the sleep request is incorporated in a downlink user frame FRMd destined for the corresponding ONU 2a to 2c connected to the base station apparatus 3a to 3c of the requestee.

Next, the ONU control circuit 132 performs wait processing for a predetermined period of time (Step St9). The period of time for the wait processing may be a period of time that is requested for the base station apparatus 3a to 3c targeted by the received sleep request to shift to the sleep state, for example.

Next, the ONU control circuit 132 turns into the sleep state the corresponding ONU 2a to 2c connected to the base station apparatus 3a to 3c targeted by the received sleep request (Step St10). In this process, the ONU control circuit 132 outputs a downlink control signal CTRd including the sleep instruction, as described above.

On the other hand, if the different base station apparatus 3a to 3c is searched out (Yes at Step St3), the sleep propriety determination circuit 133 acquires an allocated bandwidth Ba and a requested bandwidth (request value of the bandwidth) Br of the ONU 2a to 2c of the different base station apparatus 3a to 3c from the ONU management table 135a (Step St4). Next, the sleep propriety determination circuit 133 compares the allocated bandwidth Ba and the requested bandwidth Br with each other (Step St5).

If Br<Ba (No at Step St5), the sleep propriety determination circuit 133 determines that the sleep processing is approvable, the abovementioned processes at Step St8 to St10 are executed.

On the other hand, if Br≥Ba (Yes at Step St5), the sleep propriety determination circuit 133 determines that the sleep processing is not approvable, the ONU control circuit 132 discards the sleep request (Step St6).

In this manner, the sleep propriety determination circuit 133 determines that the sleep processing is not approvable if the requested bandwidth Br from the ONU 2a to 2c connected to the different base station apparatus 3a to 3c having a predetermined relationship with the base station apparatus 3a to 3c of the requestee by the sleep request is equal to or more than the allocated bandwidth Ba to the ONU 2a to 2c. Therefore, the sleep propriety determination circuit 133 may determine whether the sleep processing is approvable or not with high accuracy in accordance with the bandwidth control. Note that, the sleep propriety determination circuit 133 is not limited to this, for example, but may collect the rejection amount of the uplink user frame FRMu form each of the ONUs 2a to 2c, and may determine whether the sleep processing is approvable or not based on the rejection amount.

Next, the ONU control circuit 132 outputs a notification signal notifying the cancellation of the sleep processing (Step St7). With this, the cancellation of the sleep processing is notified to the radio NW control apparatus 5. In this manner, the processing of the sleep request of the OLT 1 is executed.

Figure 7:
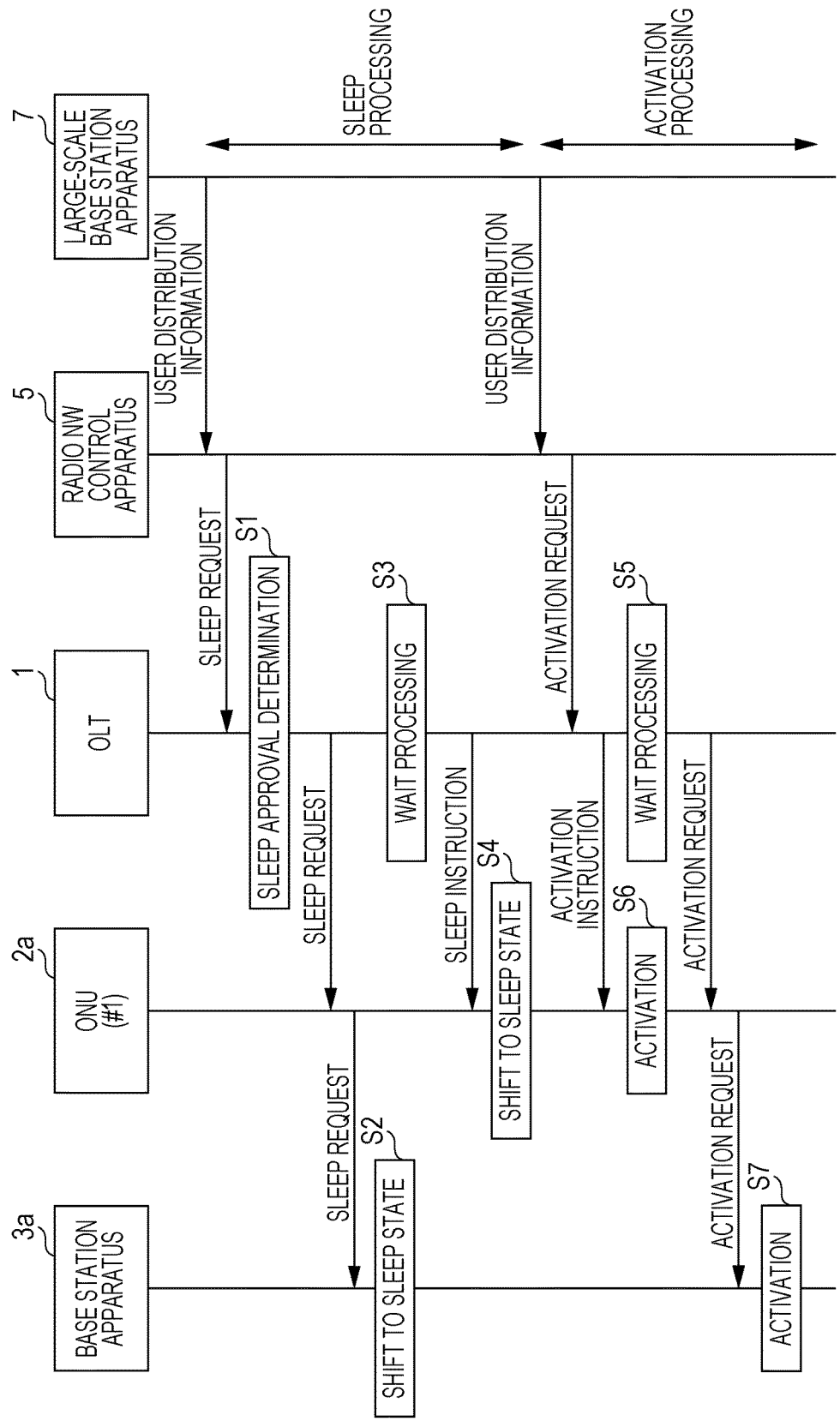
FIG. 7 is a sequence diagram illustrating one example of an operation of a communication system.

FIG. 7 is a sequence diagram illustrating one example of an operation of the communication system. FIG. 7 illustrates sleep processing and activation processing when the sleep propriety determination circuit 133 determines that the sleep request is approvable.

The large-scale base station apparatus 7 transmits user distribution information indicating distribution of the mobile terminals T of users for each of the base station apparatuses 3a to 3c, to the radio NW control apparatus 5.

The radio NW control apparatus 5 detects, based on the user distribution information, for example, the base station apparatus 3a to 3c in which the number of the wirelessly linked mobile terminals T is equal to or less than a predetermined value, and transmits a sleep request with respect to the base station apparatus 3a to 3c, to the OLT 1. In this example, as one example, the base station apparatus 3a to 3c of the requestee by the sleep request is set as the base station apparatus 3a in the small-cell area SA#1.

The radio NW control apparatus 5 issues a sleep request independent of the traffic condition within the PON, so that the sleep request is inappropriate in some cases. Therefore, as described above, the OLT 1 determines whether the sleep request is appropriate or not based on the traffic condition within the PON, by the sleep propriety determination circuit 133.

When the OLT 1 detects a sleep request, the OLT 1 determines whether the sleep processing is approvable or not, by the sleep propriety determination circuit 133. When the sleep propriety determination circuit 133 determines that the sleep processing is approvable (see a reference numeral S1), the OLT 1 transfers the sleep request to the ONU (#1) 2a. The ONU (#1) 2a transmits the sleep request transferred from the OLT 1, to the base station apparatus 3a.

Upon receiving the sleep request, the base station apparatus 3a shifts to the sleep state in accordance with the sleep request (see a reference numeral S2). This reduces the power consumption of the base station apparatus 3a.

Moreover, after transferring the sleep request, the OLT 1 performs wait processing for a predetermined period of time (see a reference numeral S3). The base station apparatus 3a shifts to the sleep state while the OLT 1 performs the wait processing. After the wait processing, the OLT 1 transmits a sleep instruction to the ONU (#1) 2a. Upon receiving the sleep instruction, the ONU (#1) 2a shifts to the sleep state in accordance with the sleep instruction (reference numeral S4). In this process, the sleep control circuit 232 in the ONU (#1) 2a stops the power supply to the semiconductor laser 21, the transmission processing circuit 22, the bandwidth request circuit 230, the buffer 24, and the receiver 25. In this manner, the sleep processing is executed.

Moreover, when the radio NW control apparatus 5 detects, for example, based on the user distribution information, that the number of the mobile terminals T wirelessly linked to the base station apparatus 3a is equal to or more than a predetermined value, the radio NW control apparatus 5 transmits an activation request with respect to the base station apparatus 3a, to the OLT 1.

When the OLT 1 detects the activation request, the OLT 1 transmits an activation instruction to the ONU (#1) 2a, and performs wait processing for a predetermined period of time (see a reference numeral S5). During the wait processing of the OLT 1, the ONU (#1) 2a activates in accordance with the activation instruction (see a reference numeral S6). After the wait processing, the OLT 1 transmits the activation request to the ONU (#1) 2a. The ONU (#1) 2a transmits the activation request to the base station apparatus 3a.

Upon receiving the activation request, the base station apparatus 3a activates in accordance with the activation request (see a reference numeral S7). In this process, the sleep control circuit 232 in the ONU (#1) 2a resumes the power supply to the semiconductor laser 21, the transmission processing circuit 22, the bandwidth request circuit 230, the buffer 24, and the receiver 25. In this manner, the activation processing is executed.

Figure 8:
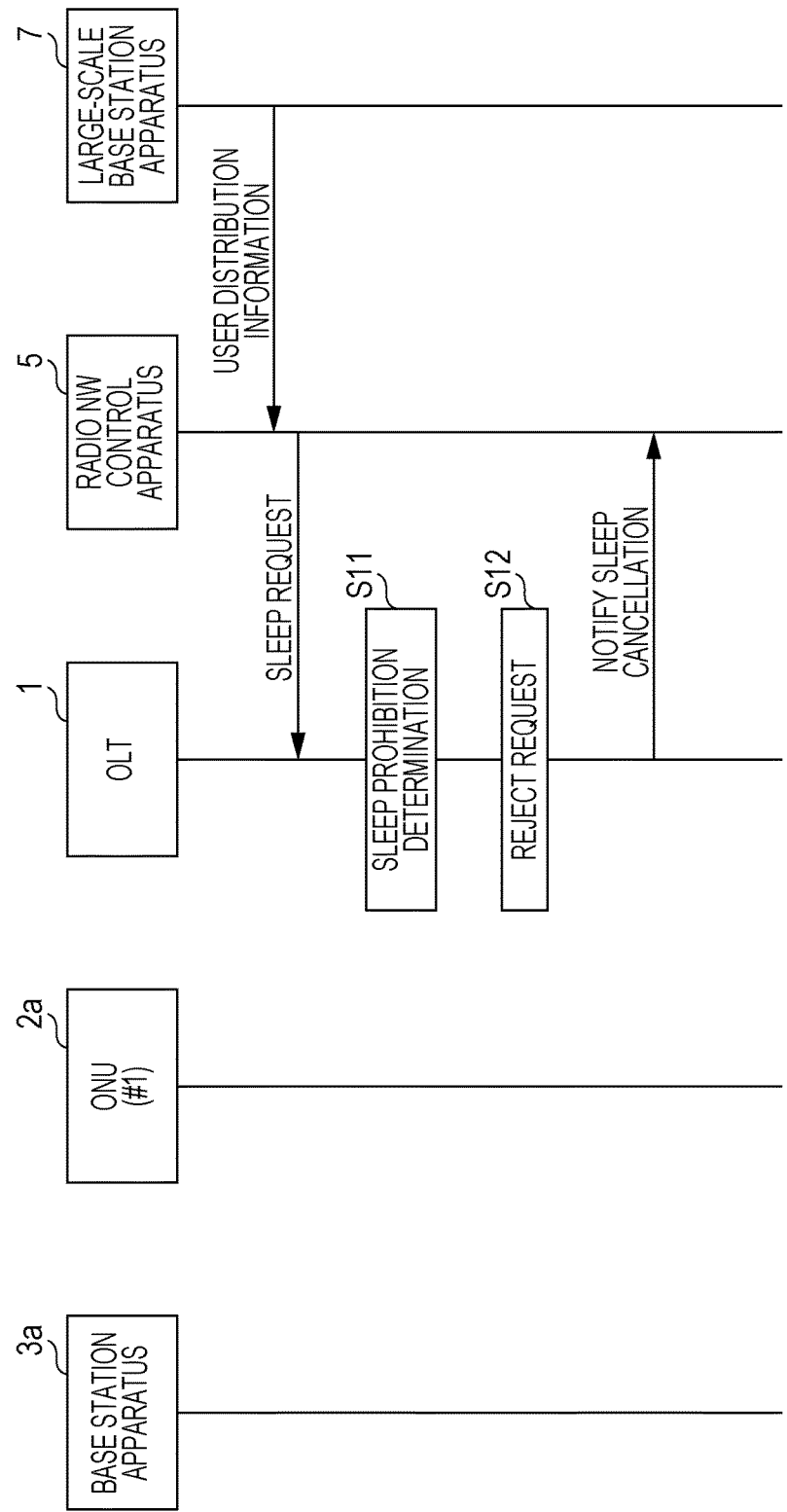
FIG. 8 is a sequence diagram illustrating another example of an operation of the communication system.

FIG. 8 is a sequence diagram illustrating another example of an operation of the communication system. FIG. 8 illustrates processing when the sleep propriety determination circuit 133 determines that the sleep request is not approvable.

When the OLT 1 detects a sleep request to the base station apparatus 3a from the radio NW control apparatus 5, the OLT 1 determines whether the sleep processing is approvable or not, by the sleep propriety determination circuit 133 (see a reference numeral S11). Next, the OLT 1 discards the sleep request (see a reference numeral S12). Therefore, the base station apparatus 3a does not receive the sleep request, and does not shift to the sleep state.

Next, the OLT 1 transmits a notification signal notifying that the sleep processing is canceled to the radio NW control apparatus 5. In this manner, the communication system operates.

In the embodiment, the bandwidth allocation circuit 134 of the OLT 1 may allocate, depending on the time of the clocking circuit 138, the bandwidth preferentially to either of the ONUs 2a to 2c respectively connected to the base station apparatuses 3a to 3c and the ONUs 2d and 2e respectively connected to the NW apparatuses 4a and 4b, over the other.

FIG. 9 illustrates one example of a change in the allocated bandwidth depending on the time. As one example, when the time indicated by the clocking circuit 138 is the working hours (for example, 9:00 to 12:00, 13:00 to 17:00) in the office buildings #1 and #2, the bandwidth allocation circuit 134 allocates the bandwidth preferentially to the ONUs 2d and 2e over the ONUs 2a to 2c. Therefore, users in the office buildings #1 and #2 may easily access the Internet, for example, from the NW apparatuses 4a and 4b, during the working hours.

Moreover, when the time indicated by the clocking circuit 138 is the off-duty hours (for example, 12:00 to 13:00, 17:00 to 0:00, 0:00 to 9:00) in the office buildings #1 and #2, the bandwidth allocation circuit 134 allocates the bandwidth preferentially to the ONUs 2a to 2c over the ONUs 2d and 2e. Therefore, users within the small-cell areas SA#1 to SA#3 may easily communicate with the mobile terminals T during the off-duty hours.

In this case, the allocated bandwidths Ba to the ONUs 2a to 2e change depending on the time, so that the sleep propriety determination circuit 133 may appropriately determine whether the sleep processing is approvable or not depending on the time.

Moreover, in the embodiment, based on the position information P1 to P3 on the base station apparatuses 3a to 3c, the sleep propriety determination circuit 133 searches for the base station apparatus 3a to 3c positioned within the predetermined distance D from the base station apparatus 3a to 3c of the requestee by the sleep request, however, the embodiment is not limited to this. The sleep propriety determination circuit 133 may make a search, for example, based on group information indicating a group to which each of the base station apparatuses 3a to 3c belongs, to find a different base station apparatus 3a to 3c that belongs to the same group as the base station apparatus 3a to 3c of the requestee by the sleep request. In this case, instead of the position information P1 to P3, group information is registered in the ONU management table 135a.

FIG. 10 illustrates another example of the ONU management table 135a. The group information indicates, for each ONU-ID, a group to which the base station apparatus 3a to 3c connected to the corresponding ONU 2a to 2c belongs.

The group information is registered in advance in the ONU management table 135a when an operation of the corresponding ONU 2a to 2e is started. Groups to which the base station apparatuses 3a to 3c belong are decided, for example, based on a map of the surrounding of the base station apparatuses 3a to 3c. As one example, when the base station apparatuses 3a and 3b are set along the same road, the base station apparatuses 3a and 3b are decided to be in the same group of a group "X". The setting of the group information may be decided based on anything as long as the base station apparatuses 3a and 3b that belong to the same group have a relationship having a possibility that the base station apparatuses 3a and 3b may mutually cover traffics with movements of the mobile terminals T.

In this example, the base station apparatuses 3a and 3b belong to the same group "X", and the base station apparatus 3c belongs to another group "Y". Therefore, when a sleep request to the base station apparatus 3a is detected, the sleep propriety determination circuit 133 searches, based on the group information, for the different base station apparatus 3b that belongs to the same group "X" as the base station apparatus 3a of a requestee. The sleep propriety determination circuit 133 determines whether the sleep processing is approvable or not based on a shortage bandwidth within the PON in the searched-out base station apparatus 3b.

More specifically, the sleep propriety determination circuit 133 acquires a requested bandwidth Br and an allocated bandwidth Ba of the searched-out base station apparatus 3b from the ONU management table 135a, and compares the requested bandwidth Br and the allocated bandwidth Ba with each other. If the requested bandwidth Br is equal to or more than the allocated bandwidth Ba, for example, the sleep propriety determination circuit 133 determines that the sleep processing is not approvable. In other words, the sleep propriety determination circuit 133 determines that the sleep processing is not approvable when the different base station apparatus 3b capable of covering the traffics of the base station apparatus 3a of the requestee by the sleep request has congested traffics. On the other hand, if the requested bandwidth Br is less than the allocated bandwidth Ba, the sleep propriety determination circuit 133 determines that the sleep processing is approvable.

In the case of the example in FIG. 10, Br≥Ba is obtained for the ONU 2b connected to the base station apparatus 3b, so that the sleep propriety determination circuit 133 determines that the sleep processing is not approvable. With this, the base station apparatus 3a of the requestee is not in sleep state, so that the base station apparatus 3a of the requestee may cover the traffics of the different base station apparatus 3b provided along the same road, for example.

Figure 11:
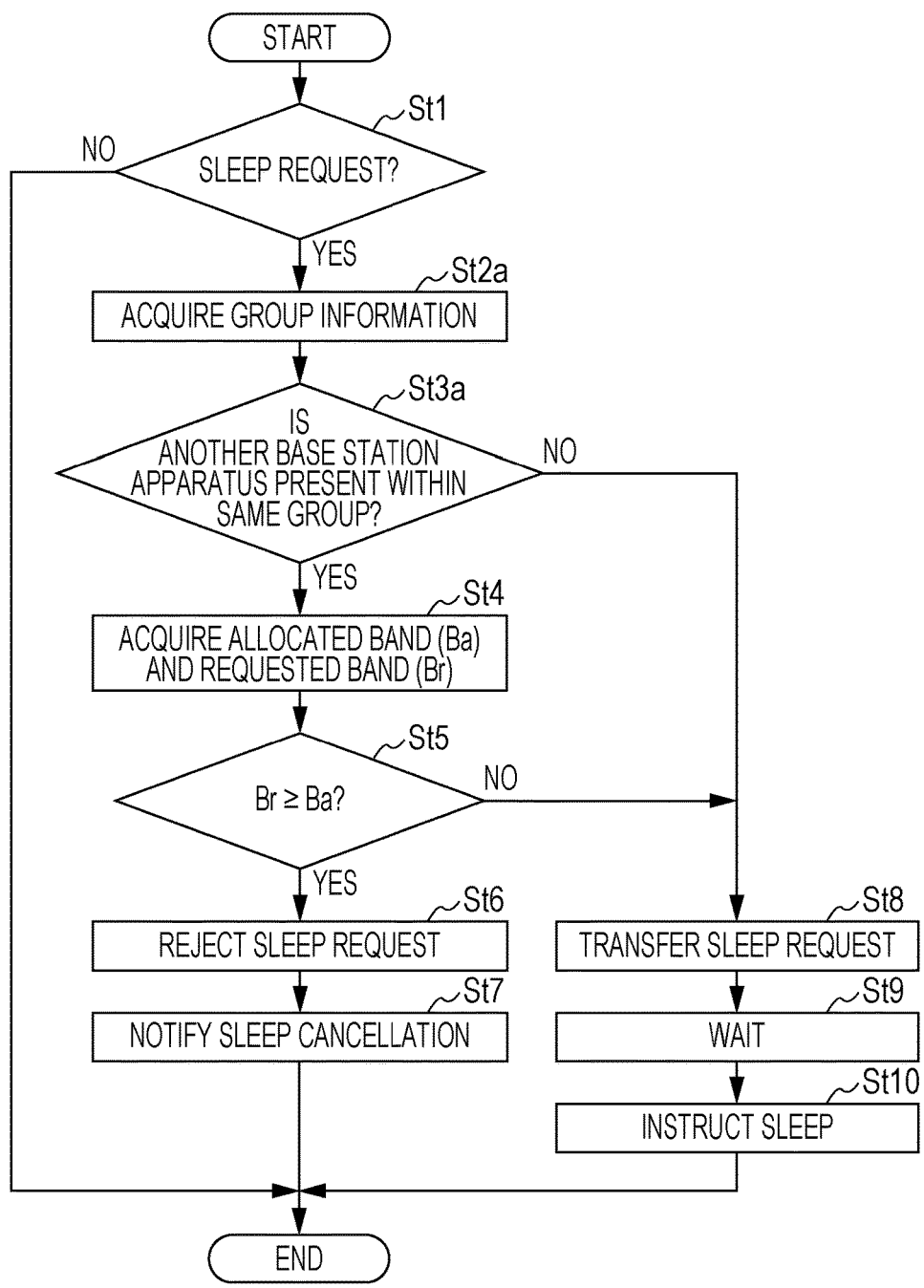
FIG. 11 is a flowchart illustrating another example of an operation of the OLT.

FIG. 11 is a flowchart illustrating an operation of the OLT 1 in this example. In FIG. 11, the same reference numerals are given to the processes common to FIG. 6, and explanations thereof are omitted.

If a sleep request is detected (Yes at Step St1), the sleep propriety determination circuit 133 acquires group information on the base station apparatuses 3a to 3c, from the ONU management table 135a (Step St2a). Next, the sleep propriety determination circuit 133 based on the group information, determines the presence or absence of a different (another) base station apparatus 3a to 3c that belongs to the same as the base station apparatus 3a to 3c of a requestee (Step St3a).

If the different base station apparatus 3a to 3c is not searched out (No at Step St3a), the processes at from Step St8 to St10 are executed. On the other hand, if the different base station apparatus 3a to 3c is searched out (Yes at Step St3a), the processes at Step St4 and subsequent Steps are executed. In this manner, the OLT 1 operates.

As described in the foregoing, the OLT 1 in the embodiment is connected to the multiple ONUs 2a to 2e that are respectively connected to the base station apparatuses 3a to 3c via the PON, and is connected to the radio NW control apparatus 5 that communicates the base station apparatuses 3a to 3c via the PON. The OLT 1 includes the request detection circuit 131, the sleep propriety determination circuit 133, and the ONU control circuit 132.

The request detection circuit 131 detects a sleep request from the radio NW control apparatus 5 to the base station apparatus 3a to 3c. When the request detection circuit 131 detects a sleep request, the sleep propriety determination circuit 133 determines whether sleep processing of turning into a sleep state the base station apparatus 3a to 3c of the requestee in accordance with the sleep request, based on a shortage bandwidth within the PON in a different base station apparatus 3a to 3c having a predetermined relationship with the base station apparatus 3a to 3c of the requestee by the sleep request.

The ONU control circuit 132 discards the sleep request when the sleep propriety determination circuit 133 determines that the sleep processing is not approvable, and transfers the sleep request to the base station apparatus 3a to 3c of the requestee when the sleep propriety determination circuit 133 determines that the sleep processing is approvable.

With the abovementioned configuration, the sleep propriety determination circuit 133 determines whether the sleep processing is approvable or not, based on a shortage bandwidth within the PON in a different base station apparatus 3a to 3c having a predetermined relationship with the base station apparatus 3a to 3c of the requestee by the sleep request. Accordingly, whether the sleep processing is approvable or not is determined based on the shortage bandwidth within the PON in the different base station apparatus 3a to 3c capable of covering the traffics of the base station apparatus 3a to 3c of the requestee.

The ONU control circuit 132 discards the sleep request when the sleep propriety determination circuit 133 determines that the sleep processing is not approvable. In this case, the base station apparatus 3a to 3c of the requestee by the sleep request is not turned into the sleep state, but may cover the traffics of a different base station apparatus 3a to 3c having a predetermined relationship with the base station apparatus 3a to 3c of the requestee by the sleep request.

Moreover, when the sleep propriety determination circuit 133 determines that the sleep processing is approvable, the ONU control circuit 132 transfers the sleep request to the base station apparatus 3a to 3c of the requestee. In this case, the base station apparatus 3a to 3c of the requestee by the sleep request is turned into the sleep state, so that the power consumption is reduced.

Accordingly, the OLT 1 in the embodiment may appropriately reduce the power consumption.

Moreover, the communication system in the embodiment includes the OLT 1 and the multiple ONUs 2a to 2e connected via the PON. Parts of the ONUs 2a to 2e are respectively connected to the base station apparatuses 3a to 3c, and the OLT 1 is connected to the radio NW control apparatus 5 that communicates with the base station apparatuses 3a to 3c, via the PON.

The OLT 1 includes the request detection circuit 131, the sleep propriety determination circuit 133, and the ONU control circuit 132.

The request detection circuit 131 detects a sleep request from the radio NW control apparatus 5 to the base station apparatus 3a to 3c. When the request detection circuit 131 detects a sleep request, the sleep propriety determination circuit 133 determines whether sleep processing of turning the base station apparatus 3a to 3c of the requestee into a sleep state in accordance with the sleep request, based on a shortage bandwidth within the PON in a different base station apparatus 3a to 3c having a predetermined relationship with the base station apparatus 3a to 3c of the requestee by the sleep request.

The ONU control circuit 132 discards the sleep request when the sleep propriety determination circuit 133 determines that the sleep processing is not approvable, and transfers the sleep request to the base station apparatus 3a to 3c of the requestee when the sleep propriety determination circuit 133 determines that the sleep processing is approvable.

The communication system in the embodiment including the similar configuration to the abovementioned OLT 1 exhibits functional effects similar to the contents described above.

Moreover, a communication control method in the embodiment is a communication control method of the OLT 1 that is connected to the multiple ONUs 2a to 2e respectively connected to the base station apparatuses 3a to 3c via the PON, and is connected to the radio NW control apparatus 5 that communicates with the base station apparatuses 3a to 3c via the PON, and includes the following steps. Step (1): detecting a sleep request from the radio NW control apparatus 5 to the base station apparatus 3a to 3c. Step (2): determining whether sleep processing of turning the base station apparatus 3a to 3c of the requestee into a sleep state in accordance with the sleep request based on a shortage bandwidth within the PON in a different base station apparatus 3a to 3c having a predetermined relationship with the base station apparatus 3a to 3c of the requestee by the sleep request. Step (3): discarding the sleep request when it is determined that the sleep processing is not approvable, and transferring the sleep request to the base station apparatus 3a to 3c of the requestee when it is determined that the sleep processing is approvable.

The communication control method in the embodiment including the similar configuration to the abovementioned the OLT 1 exhibits functional effects similar to the contents described above.

Moreover, each component element in each illustrated unit may not to be physically configured as illustrated in the drawings. In other words, the specific mode of distribution or integration of each unit is not limited to the one as illustrated in the drawings, but the whole or a part thereof may be configured by being functionally or physically distributed or integrated in arbitrary units in accordance with various kinds of loads, use statuses, or the like. In the abovementioned embodiment, excluding the reference numerals, the whole or an arbitrary part of the electric-light conversion circuit, the transmission processing circuit, the control signal insertion circuit, the request detection circuit, the ONU control circuit, the sleep propriety determination circuit, the bandwidth allocation circuit, the light-electric conversion circuit, the reception processing circuit, the bandwidth request processing circuit, the notification signal insertion circuit, the separation circuit, the multiplexing circuit, the detection circuit, the control circuit, the bandwidth request circuit, the clocking circuit, the sleep instruction detection circuit, the period specification detection circuit, and the transmission period control circuit, may be executed on a central processing unit (CPU), a digital signal processor (DSP), an integrated circuit (IC), a field programmable gate array (FPGA), or the like. In addition, multiple various kinds of circuits may be integrated to one circuit, and the whole or an arbitrary part of the one circuit may be executed on a central processing unit (CPU), a digital signal processor (DSP), an integrated circuit (IC), a field programmable gate array (FPGA), or the like. The electric-light conversion circuit may be configured to include a photo diode, and the light-electric conversion circuit may be configured to include a semiconductor laser. Moreover, the whole or arbitrary part of the various kinds of the circuits may be implemented by programs analyzed and executed by a CPU or the like, or by wired logic hardware. A memory that holds various kinds of information may be configured by, for example, a read only memory (ROM), or a random access memory (RAM) such as a synchronous dynamic random access memory (SDRAM), a magnetoresistive random access memory (MRAM), and a non-volatile random access memory (NVRAM). The embodiment described above is an example of the preferred execution of the present disclosure. Note that, the present disclosure is not limited to the embodiment described above, but the various components may be modified without deviating from the spirit of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical line termination that is coupled to a plurality of optical network units coupled to base stations via a passive optical network (PON), and is coupled to a control apparatus that communicates with the base stations via the PON, the optical line termination comprising:
   a detection circuit configured to detect a sleep request from the control apparatus to base stations;
   a determination circuit configured to determine, when the detection circuit detects the sleep request, whether processing of turning the base stations of requestees by the sleep request into a sleep state in accordance with the sleep request is approvable or not, based on a shortage bandwidth within the PON in a different one of the base stations having a predetermined relationship with the requested base station; and
   a control circuit configured to discard the sleep request when the determination circuit determines that the processing is not approvable, or transfer the sleep request to the base station of the different requestee when the determination circuit determines that the processing is approval.

2. The optical line termination according to claim 1, wherein when the determination circuit determines that the processing is approvable, the control circuit turns into a sleep state one of the plurality of optical network units coupled to the base station of the requestee.

3. The optical line termination according to claim 1, further comprising an allocation circuit configured to allocate a bandwidth within the PON to each of the plurality of optical network units, in response to a request of the bandwidth from the optical network unit, wherein
the determination circuit is configured to determine that the processing is not approvable, when a bandwidth requested by a different one of the plurality of optical network units coupled to the different base station having the predetermined relationship with the base station of the requestee by the sleep request is equal to or more than a bandwidth allocated to the different optical network unit by the allocation circuit.

4. The optical line termination according to claim 3, wherein,
the plurality of optical network units include a first set of optical network units coupled to the base stations, and a second set of optical network units coupled to apparatuses other than the base stations,
the optical line termination further comprises a clocking circuit configured to clock a time, and
the allocation circuit allocates, depending on the time, a bandwidth with preferentially to one of the first and second sets of the optical network units over the other set.

5. The optical line termination according to any one of claim 1, further comprising a holding circuit configured to hold position information indicating a position of each of the base stations, wherein
when the detection circuit is configured to detect the sleep request, the determination circuit is configured to search the base stations based on the position information, for a different base station positioned within a predetermined distance from the base station of the requestee by the sleep request, and determine whether the processing is approvable or not, based on a shortage bandwidth within the PON in the searched-out different base station.

6. The optical line termination according to claim 1, further comprising a holding circuit configured to hold group information that indicates a group to which each of the base stations belongs, wherein
when the detection circuit detects the sleep request, the determination circuit searches the base stations based on the group information, for a different base station belonging to the same group as the base station of the requestee by the sleep request, and determines whether the processing is approvable or not, based on a shortage bandwidth within the PON in the searched-out different base station.

7. A communication system comprising
an optical line termination and a plurality of optical network units, the optical line termination being coupled to the plurality of optical network units via a PON, wherein
the plurality of optical network units includes a first set of optical network units each coupled to a base station,
the optical line termination is coupled to a control apparatus that communicates with the base stations via the PON, and
the optical line termination includes:
a detection circuit configured to detect a sleep request from the control apparatus to the base stations;
a determination circuit configured to determine, when the detection circuit detects the sleep request, whether processing of turning the base station of a requestee by the sleep request into a sleep state in accordance with the sleep request is approvable or not, based on a shortage bandwidth within the PON in a different one of the base stations having a predetermined relationship with the base station of a requestee by the sleep request, a propriety of processing in which the base station of the requestee is turned into a sleep state in accordance with the sleep request; and
a control circuit configured to discard the sleep request when the determination circuit determines that the processing is not approvable, or to transfer the sleep request to the base station of the requestee when the determination circuit determines that the processing is approvable, and turn into a sleep mode one of the plurality of optical network units coupled to the base station of the requestee.

8. The communication system according to claim 7, wherein when the determination circuit determines that the processing is approvable, the control circuit makes turns into the sleep state one of the plurality of optical network units coupled to the base station of the requestee.

9. The communication system according to claim 7, wherein
the optical line termination further includes an allocation circuit configured to allocate a bandwidth within the PON to each of the plurality of optical network units, in response to a request of the bandwidth from the optical network unit, and
the determination circuit determines that the processing is not approvable, when a bandwidth requested by a different one of the plurality of optical network units coupled to the different base station having the predetermined relationship with the base station of the requestee by the sleep request is equal to or more than a bandwidth allocated to the different optical network unit by the allocation circuit.

10. The communication system according to claim 9, wherein,
the plurality of optical network units includes a first set of the optical network units coupled to the base stations, and a second set of the optical network units coupled to apparatuses other than the base stations,
the optical line termination further includes a clocking circuit configured to clock a time, and
the allocation circuit allocates, depending on the time, a bandwidth with preferentially to one of the first and second sets of the optical network units over the other set.

11. The communication system according to claim 7, wherein
the optical line termination further includes a holding circuit configured to hold position information indicating a position of each of the base stations, and
when the detection circuit detects the sleep request, the determination circuit searches the base stations based on the position information, for a different base station positioned within a predetermined distance from the base station of the requestee by the sleep request, and determine whether the processing is approvable or not, based on a shortage bandwidth within the PON in the searched-out different base station.

12. The communication system according to claim 7, wherein
the optical line termination further includes a holding circuit configured to hold group information indicating a group to which each of the base stations belongs, and
when the detection circuit detects the sleep request, the determination circuit searches the base stations based on the group information, for a different base station belonging to the same group as the base station of the requestee by the sleep request, and determines whether the processing is approvable or not based on a shortage bandwidth within the PON in the searched-out different base station.

13. A communication control method of an optical line termination that is coupled to a plurality of optical network units coupled to base stations via a PON, and is coupled to a control apparatus that communicates with the base stations via the PON, the communication control method comprising:
    detecting a sleep request from the control apparatus to the base station;
    determining whether processing of turning the base station of a requestee by the sleep request into a sleep state in accordance with the sleep request is approvable or not, based on a shortage bandwidth within the PON in a different one of the base stations having a predetermined relationship with the base station of the requestee by the sleep request;
    discarding the sleep request when it is determined that the processing is not approvable; and
    transferring the sleep request to the base station of the requestee when it is determined that the processing is approvable.

14. The communication control method according to claim 13, wherein when it is determined that the processing is approvable, the control circuit turns into a sleep state one of the plurality of optical network units coupled to the base station of the requestee.

15. The communication control method according to claim 13, further comprising allocating a bandwidth within the PON to each of the plurality of optical network units in response to a request of the bandwidth from the optical network unit, wherein it is determined that the processing is not approvable when a bandwidth requested by a different one of the plurality of optical network units coupled to the different base station having the predetermined relationship with the base station of the requestee by the sleep request is equal to or more than a bandwidth allocated to the different optical network unit.

16. The communication control method according to claim 15 further comprising clocking a time, wherein
    in the allocating, depending on the time, a bandwidth is allocated preferentially to one of the first and second sets of the optical network units over the other set.

17. The communication control method according to claim 13, further comprising searching, when the sleep request is detected, the base stations based on the position information, for a different base station positioned within a predetermined distance from the base station of the requestee by the sleep request, wherein
    in the determining, whether the processing is approvable or not is determined based on a shortage bandwidth within the PON in the searched-out different base station.

18. The communication control method according to claim 13, further comprising searching, when the sleep request is detected, the base stations based on group information indicating a group to which each of the base stations belongs, for a different base station belonging to the same group as the base station of the requestee by the sleep request, wherein
    in the determining, whether the processing is approvable or not is determined based on a shortage bandwidth within the PON in the searched-out different base station.

* * * * *